(12) United States Patent
Cho

(10) Patent No.: US 9,878,716 B2
(45) Date of Patent: Jan. 30, 2018

(54) OVERHEAT PREVENTING METHOD OF CLUTCH FOR VEHICLE

(71) Applicant: Hyundai Motor Company, Seoul (KR)

(72) Inventor: Woon Ki Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/257,654

(22) Filed: Sep. 6, 2016

(65) Prior Publication Data

US 2017/0267240 A1 Sep. 21, 2017

(30) Foreign Application Priority Data

Mar. 18, 2016 (KR) .................. 10-2016-0032940

(51) Int. Cl.
*B60W 30/186* (2012.01)
*B60W 30/188* (2012.01)

(52) U.S. Cl.
CPC ........ *B60W 30/186* (2013.01); *B60W 30/188* (2013.01); *B60W 2510/0291* (2013.01); *B60W 2710/0605* (2013.01)

(58) Field of Classification Search
None
See application file for complete search history.

(56) References Cited

U.S. PATENT DOCUMENTS

| 2002/0006848 A1* | 1/2002 | Tabata | ............... F02D 23/00 |
|---|---|---|---|
| | | | 477/32 |
| 2010/0106384 A1* | 4/2010 | Mita | ............... B60K 17/35 |
| | | | 701/68 |

FOREIGN PATENT DOCUMENTS

| JP | H02-195026 A | 8/1990 |
|---|---|---|
| JP | 2013-83318 A | 5/2013 |
| JP | 2016-17599 A | 2/2016 |
| KR | 10-2011-0051059 A | 5/2011 |
| KR | 10-1293014 B1 | 8/2013 |
| KR | 10-2015-0069398 A | 6/2015 |

* cited by examiner

*Primary Examiner* — Jonathan M Dager
*Assistant Examiner* — Garrett F Evans
(74) *Attorney, Agent, or Firm* — Morgan, Lewis & Bockius LLP

(57) ABSTRACT

An overheat preventing method of a clutch for a vehicle may include a first comparing, by a controller, of comparing a temperature of a clutch with a first set temperature, as a result of performing the first comparing, when the temperature of the clutch is higher than the first set temperature, accelerator pedal map increasing, by the controller, of controlling a gain of an accelerator pedal map to be increased, after the accelerator pedal map increasing, a second comparing, by the controller, of comparing the temperature of the clutch with a second set temperature set to be lower than the first set temperature, and as a result of performing the second comparing, when the temperature of the clutch is lower than the second set temperature, an accelerator pedal map recovering, by the controller, of controlling the gain of the accelerator pedal map to be recovered to a reference value.

5 Claims, 3 Drawing Sheets

OVERHEAT PREVENTING METHOD OF CLUTCH FOR VEHICLE

CROSS REFERENCE TO RELATED APPLICATION

The present application claims priority to Korean Patent Application No. 10-2016-0032940, filed Mar. 18, 2016, the entire contents of which is incorporated herein for all purposes by this reference.

BACKGROUND OF THE INVENTION

Field of the Invention

The present invention relates to an overheat preventing method of a clutch for a vehicle by generating slip of a driving wheel by controlling a gain of an accelerator pedal map to be increased when a clutch in a transmission overheats.

Description of Related Art

An automated manual transmission is a system which automatically controls a manual transmission mechanism and transfers an engine torque to a shift mechanism by using a dry clutch unlike a general automatic transmission using a torque converter and a wet multiple disk clutch.

A transfer torque of the dry clutch is changed due to many factors such as abrasiveness due to part tolerance and aging of components, a thermal deformation due to high temperature, and a change in coefficient of friction of a disk, in particular, greatly changed according to temperature.

Compared to the wet clutch, the dry clutch generates a larger amount of slip under a slope road starting condition in which a gradient resistance is generated, which is a factor of excessively increasing the temperature of the clutch. As described above, when the temperature of the clutch in the transmission excessively rises, the thermal deformation occurs, and as a result a shock may be applied to the clutch or a torque may not be properly transferred to the clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an overheat preventing method of a clutch for a vehicle capable of decreasing a temperature of the clutch by decreasing a slip amount of the clutch by controlling a gain of an accelerator pedal map to be increased when a temperature of the clutch in the transmission is excessive.

According to various aspects of the present invention, an overheat preventing method of a clutch for a vehicle may include a first comparing, by a controller, of comparing a temperature of a clutch in a transmission with a first set temperature, as a result of performing the first comparing, when the temperature of the clutch is higher than the first set temperature, accelerator pedal map increasing, by the controller, of controlling a gain of an accelerator pedal map to be increased, after the accelerator pedal map increasing, a second comparing, by the controller, of comparing the temperature of the clutch with a second set temperature set to be lower than the first set temperature, and as a result of performing the second comparing, when the temperature of the clutch is lower than the second set temperature, accelerator pedal map recovering, by the controller, of controlling the gain of the accelerator pedal map to be recovered to a reference value.

The overheat preventing method may further include a third comparing, by the controller, of comparing a sensing value of an accelerator sensor which senses a longitudinal acceleration of the vehicle with a reference region value, after the accelerating pedal map increasing, in which as a result of performing the third comparing, when the sensing value is included in the reference region value, the controller may perform the second comparing.

The overheat preventing method may further include as a result of performing the third comparing, when the sensing value is not included in the reference region value, a fourth comparing, by the controller, of comparing the sensing value with a minimum value of the reference region value, in which as a result of performing the fourth comparing, when the sensing value is smaller than the minimum value of the reference region value, the controller may again perform the accelerator pedal map increasing.

The overheat preventing method may further include as a result of performing the fourth comparing, when the sensing value is not smaller than the minimum value of the reference region value, an accelerator pedal map decreasing, by the controller, of controlling the gain of the accelerator pedal map to be decreased.

The controller may again perform the third comparing, after the accelerator pedal map decreasing.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
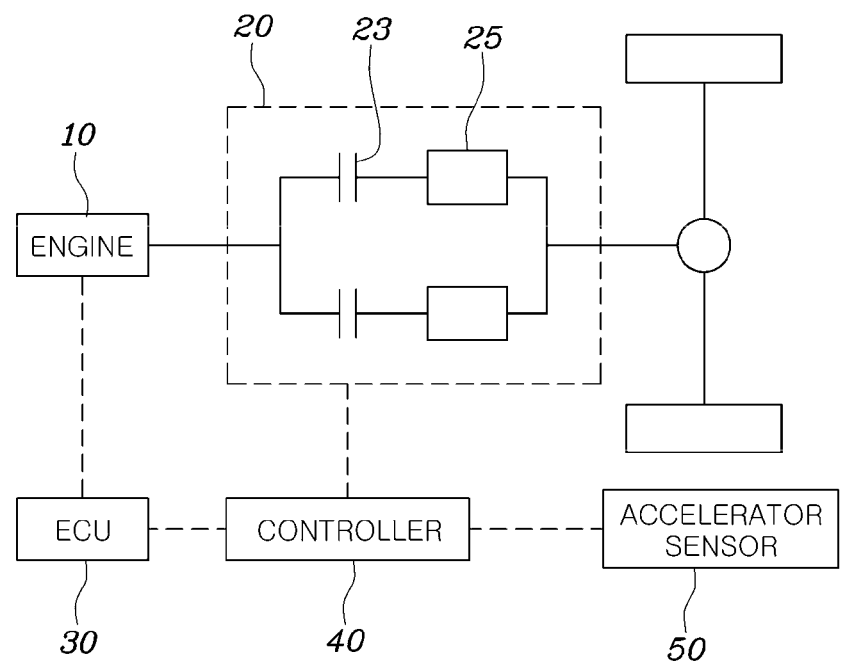
FIG. 1 is a diagram illustrating an overheat preventing apparatus of a clutch for a vehicle according to various embodiments of the present invention.

FIG. 1 is a diagram illustrating an overheat preventing apparatus of a clutch for a vehicle according to various embodiments of the present invention. Referring to FIG. 1, an engine 10 is connected to a differential apparatus of a vehicle via a transmission 20. In particular, the transmission 20 is includes a clutch 23 and a gear box 25 and directly connects or disconnects the engine 10 to or from a wheel of the vehicle depending on engagement of the clutch 23. If the clutch 23 is engaged, a driving force of the engine 10 is directly transferred to the wheel and if the clutch 23 is disengaged, the driving force of the engine 10 will not be transferred to the wheel. The engine 10 and the transmission 20 are each controlled by an engine control unit (ECU) 30 and a controller 40 and the ECU 30 and the controller 40 transmit and receive a control signal to and from each other through CAN communication. Further, the controller 40 may sense a longitudinal movement of a vehicle using an accelerator sensor 50. The detailed operation of the above components will be described below.

Hereinafter, an overheat preventing method of a clutch for a vehicle according to various embodiments of the present invention will be described with reference to the accompanying drawings.

Figure 2:
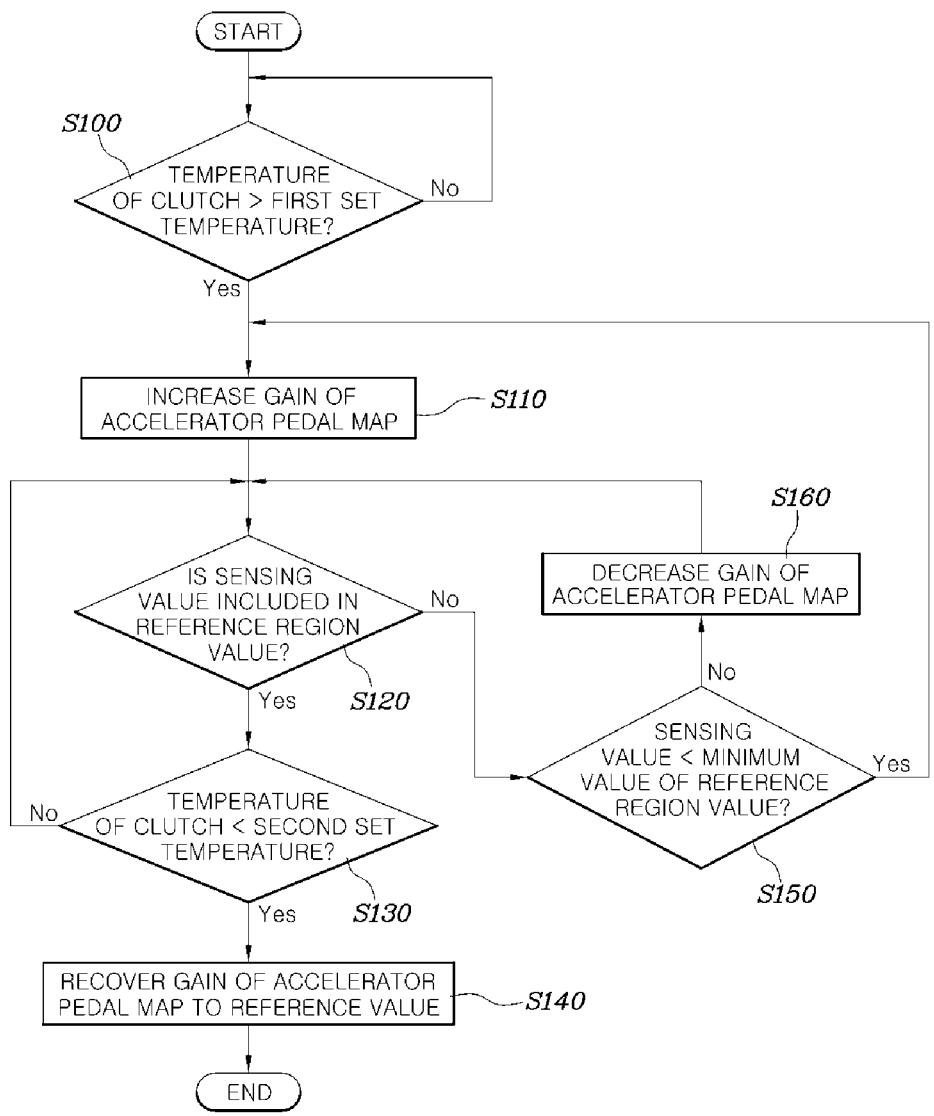
FIG. 2 is a flow chart illustrating an overheat preventing method of a clutch for a vehicle according to various embodiments of the present invention.

FIG. 2 is a flow chart illustrating an overheat preventing method of a clutch for a vehicle according to various embodiments of the present invention. Referring to FIGS. 1 and 2, the overheat preventing method of a clutch for a vehicle may include a first comparing step (S100) of comparing, by the controller 40, a temperature of the clutch 23 in the transmission 20 with a first set temperature, as a result of performing the first comparing step (S100), if the temperature of the clutch 23 is higher than the first set temperature, an accelerator pedal map increasing step (S110) of controlling, by the controller 40, a gain of an accelerator pedal map to be increased. The method may further include after the accelerator pedal map increasing step (S110), a second comparing step (S130) of comparing, by the controller 40, the temperature of the clutch 23 with a second set temperature set to be lower than the first set temperature, and as a result of performing the second comparing step (S130), when the temperature of the clutch 23 is lower than the second set temperature, an accelerator pedal map recovering step (S140) of controlling, by the controller 40, the gain of the accelerator pedal map to be recovered to a reference value.

The controller 40 estimates the temperature of the clutch 23 installed in the transmission 20 and compares the estimated temperature of the clutch with the first set temperature (S100). Here, the controller 40 may measure and calculate factors such as a slip amount, a slip time, and a transfer torque of the clutch and an oil temperature of the transmission by various sensors to estimate the temperature of the clutch 23 in the transmission and the method of calculating a temperature of a clutch is variously disclosed in the existing technologies and therefore the detailed description thereof will be omitted.

The first set temperature compared with the temperature of the clutch 23 may be set to be the temperature of the clutch 23 when it is determined that the clutch 23 overheats. This is a value that may be set to be changed depending on a vehicle model, the clutch, or a designer, and therefore will not be limited to a specific value.

If the temperature of the clutch 23 is higher than the first set temperature due to the slope road starting condition of the vehicle, or the like, the controller 40 determines that the clutch 23 overheats to control the gain of the accelerator pedal map to be increased (S110), in which the accelerator pedal map is a map representing an engine torque and a change in engine RPM depending on a measurement value of an accelerator pedal sensor (APS).

Figure 3A:
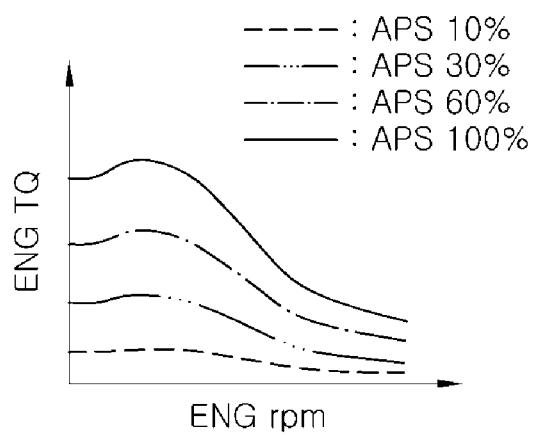
FIGS. 3A and 3B are graphs illustrating a change in an accelerator pedal map according to various embodiments of the present invention.
Figure 3B:
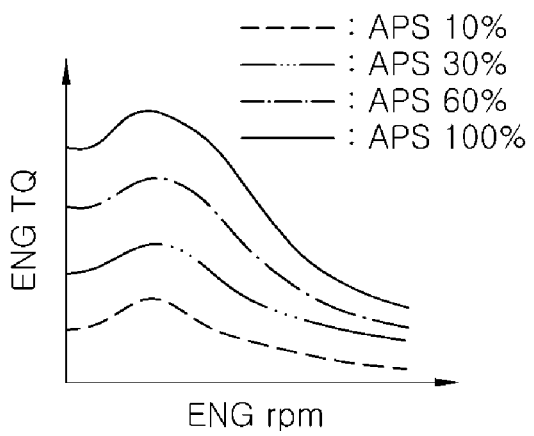

FIGS. 3A and 3B are graphs illustrating an accelerator pedal map according to various embodiments of the present invention. FIG. 3A illustrates the accelerator pedal map which becomes a reference value when the temperature of the clutch is normal. However, if the temperature of the clutch is higher than the first set temperature, as illustrated in FIG. 3B, the controller may control the engine torque with respect to the APS measurement value to be increased.

As described above, if the temperature of the clutch exceeds the first set temperature even though the APS measurement value is the same, the engine torque is controlled to be increased and as a result, a slip of a driving wheel is generated. That is, when the vehicle is driven to generate the slip in the driving wheel compared to the case in which the vehicle is driven without the slip of the driving wheel when the vehicle is driven, the heat generation energy increase amount and the temperature of the clutch is decreased. Therefore, the slip between the driving wheel and a ground surface is generated by intentionally increasing the engine torque with respect to the APS measurement value, and as a result the slip amount of the clutch is decreased, thereby preventing the clutch from overheating.

Next, when the temperature of the clutch 23 is lower than the second set temperature set to be lower than the first set temperature, the controller 40 may control the gain of the accelerator pedal map to be recovered to the reference value, that is, the accelerator pedal map to be recovered as illustrated in FIG. 3A.

As described above, if the gain of the accelerator pedal map is controlled to be increased, the slip amount and the slip time of the clutch are decreased while a rotating inertia of the driving system is suddenly decreased for a short time, such that the heat generation energy of the clutch is decreased. However, there is a problem in that the vehicle may be vibrated back and forth due to the change in inertia of the driving system.

Accordingly, the present technology further includes a third comparing step (S120) of comparing, by the controller 40, a sensing value of the accelerator sensor 50 detecting the longitudinal acceleration of the vehicle with a reference region value after the accelerating pedal map increasing step (S110). As a result of performing the third comparing step (S120), if the sensing value is included in the reference region value, the controller 40 may perform the second comparing step (S130).

That is, the controller 40 senses the front and back motions of the vehicle by the accelerator sensor 50 and only when the sensing value of the accelerator sensor 50 is included in the reference region value, determines that the vehicle is in a normal state to perform the second comparing step (S130). Here, the reference region value may be set to be changed according to the vehicle model and the designer.

However, as a result of performing the third comparing step (S120), if the sensing value is not included in the reference region value, the present technology further includes a fourth comparing step (S150) of comparing, by the controller 40, the sensing value with a minimum value of the reference region value. As a result of performing the fourth comparing step (S150), if the sensing value is smaller than a minimum value of the reference region value, the controller 40 may again perform the accelerator pedal map increasing step (S110).

That is, the fact that the sensing value of the accelerator sensor 50 is smaller than the minimum value of the reference region value means that the longitudinal vibration of the vehicle is very small, and therefore the controller 40 controls the gain of the accelerator pedal map to be increased, thereby decreasing the slip amount of the clutch 23. Therefore, it is possible to prevent the temperature of the clutch 23 from excessively rising.

On the contrary, as a result of performing the fourth comparing step (S150), if the sensing value is not smaller than the minimum value of the reference region value, the present technology may further include an accelerator pedal map decreasing step (S160) of controlling, by the controller 40, the gain of the accelerator pedal map to be decreased.

That is, the controller 40 may determine that the front and back vibrations of the vehicle are strongly generated if the sensing value of the accelerator sensor 50 is not included in the reference region value but is larger than the maximum value of the reference region value. Therefore, it is possible to control the gain of the accelerator pedal map to be decreased to decrease the slip of the driving wheel.

Therefore, the front and back vibrations of the vehicle due to the slip of the driving wheel may be prevented, and as a result, marketability of the vehicle may be maintained. Further, the heat generation of the clutch 23 may be suppressed at the maximum while the vibration level of the vehicle is constantly maintained.

In this case, the controller 40 may set a ratio of controlling the gain of the accelerator pedal map to be decreased in the accelerator pedal map decreasing step (S160) to be smaller than a ratio of controlling the gain of the accelerator pedal map to be increased in the accelerator pedal map increasing step (S110). This is to maximally prevent the heat generation of the clutch 23 in the state in which the vibration of the vehicle is continuously kept appropriate.

For example, in the accelerator pedal map increasing step (S110), the controller may increase the gain of the accelerator pedal map by 30% and in the accelerator pedal map decreasing step (S160), may decrease the gain of the accelerator pedal map by 10%. However, various embodiments of the present invention are not limited to the aforementioned configuration and therefore the gain of the accelerator pedal map may be set to be changed according to the vehicle model or the designer. As a result, the numerical value is not to be limited to a specific value.

Further, in the present technology, the controller 40 may again perform the third comparing step (S120) after the accelerator pedal map decreasing step (S160). That is, since the vibrations may occur in the vehicle even though the gain of the accelerator pedal map is controlled to be decreased, to determine the vibrations, it may be compared whether the sensing value of the accelerator sensor 50 is included in the reference region value (S120).

According to the overheat preventing method of a clutch for a vehicle having the structure as described above, it is possible to prevent a shock from being applied to the clutch or a breakdown from occurring by preventing the excessive heat generation of the clutch in the transmission.

Further, it is possible to prevent the driving stability from decreasing due to the wheel slip phenomenon by controlling the longitudinal acceleration of the vehicle to be maintained within the set range.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An overheat preventing method of a clutch for a vehicle, comprising:
    a first comparing step, by a controller, of comparing a temperature of the clutch, in a transmission, with a first predetermined temperature;
    as a result of performing the first comparing, when the temperature of the clutch is higher than the first predetermined temperature, accelerator pedal map increasing step, by the controller, of controlling a gain of an accelerator pedal map to be increased;
    after the accelerator pedal map increasing step, a second comparing step, by the controller, of comparing the temperature of the clutch with a second predetermined temperature set to be lower than the first predetermined temperature; and
    as a result of performing the second comparing step, when the temperature of the clutch is lower than the second predetermined temperature, accelerator pedal map recovering step, by the controller, of controlling the gain of the accelerator pedal map to be recovered to a reference value.

2. The overheat preventing method of claim 1, further comprising:
    a third comparing, by the controller, of comparing a sensing value of an accelerator sensor which senses a longitudinal acceleration of the vehicle with a reference region value, after the accelerating pedal map increasing step,
    wherein as a result of performing the third comparing, when the sensing value is included in the reference region value, the controller performs the second comparing step.

3. The overheat preventing method of claim 2, further comprising:
    as a result of performing the third comparing step, when the sensing value is not included in the reference region value, a fourth comparing, by the controller, of comparing the sensing value with a minimum value of the reference region value, wherein as a result of performing the fourth comparing, when the sensing value is smaller than the minimum value of the reference region value, the controller again performs the accelerator pedal map increasing step.

4. The overheat preventing method of claim 3, further comprising:

as a result of performing the fourth comparing step, when the sensing value is not smaller than the minimum value of the reference region value, accelerator pedal map decreasing step, by the controller, of controlling the gain of the accelerator pedal map to be decreased.

5. The overheat preventing method of claim 4, wherein the controller again performs the third comparing step, after the accelerator pedal map decreasing step.

* * * * *